United States Patent [19]
Craig

[11] Patent Number: 5,820,451
[45] Date of Patent: Oct. 13, 1998

[54] SHELL SHOCKER (ELECTRONIC DEVICE FOR IMMOBILIZING SEAFOOD)

[75] Inventor: William Robert Craig, Churchville, Md.

[73] Assignee: William R. Craig, Churchville, Md.

[21] Appl. No.: 144,013

[22] Filed: Dec. 15, 1993

[51] Int. Cl.[6] .................................................. A22C 3/06
[52] U.S. Cl. .................... 452/59; 452/58; 452/1
[58] Field of Search ................... 452/59, 58, 57, 452/1

[56] References Cited

U.S. PATENT DOCUMENTS

| | | | |
|---|---|---|---|
| 2,879,539 | 3/1959 | Cervin | 452/58 |
| 3,555,594 | 1/1971 | Groover et al. | 452/58 |
| 3,702,017 | 11/1972 | Lewis | 452/59 |
| 3,828,397 | 8/1974 | Harbren, Jr. | 452/59 |
| 3,981,045 | 9/1976 | Collins | 452/58 |
| 4,726,321 | 2/1988 | Malone et al. | 119/2 |
| 4,751,767 | 6/1988 | Walther | 452/59 |

*Primary Examiner*—Willis Little

[57] ABSTRACT

A method and apparatus for the immobilization of live hard shell aquatic crustaceans "hard shell crabs" prior to or during processing. The apparatus includes a nonconductive container containing an electrolyte solution, the quantity of said electrolyte solution being sufficient to submerge a number of live hard shell crabs to be processed; positive and negative electrodes positioned in spaced relationship within the container and being at least substantially covered by the electrolyte solution, each of said electrodes comprising a pair of parallel metal rods projecting vertically from the bottom of the container; and an electric switch means contained in a connector box, said switch means being electrically connected intermediate the electrodes and an electrical power source for allowing an operator to activate the apparatus, whereby the electrical energy supplied to the electrodes is transferred via the electrolyte solution to the submersed crabs for their immobilization.

4 Claims, 3 Drawing Sheets

SHELL SHOCKER (ELECTRONIC DEVICE FOR IMMOBILIZING SEAFOOD)

BACKGROUND OF THE INVENTION

The present invention relates to a method and apparatus for the immobilization of live hard shell aquatic crustaceans "hard shell crabs" prior to or during processing. The crab industry standard has been to "ice" the crabs for approximately 20 minutes per bushel in order to immobilize them prior to steaming. Another method involves sticking live crabs with an ice pick (commonly referred to in the industry as "sticking"), and requires approximately 10 minutes per bushel. The "sticking" method is labor intensive, requiring each crab to be individually handled. This method also allows for much of the crabs' fat to drain away from the body leaving less flavorful meat. No prior electric device utilizing the processing technique of the instant invention has been developed. The device according to this invention differs from other known systems that may serve this purpose by unique but direct application of controlled eclectic current, specific arrangement of electrodes, and use of an electrolyte solution.

SUMMARY OF THE INVENTION

The object of the invention is to provide a simple yet durable electronic device that will temporarily or permanently immobilize live crabs. The invention enhances live crab processing while reducing processing damage to the products' operator and equipment.

The inventor is knowledgeable of the crab industry standard to ice live crabs prior to steaming. The icing process is used to immobilize live crabs and the process itself requires a 20 minute icing period per bushel of crabs. The reason for this processing method is to ensure that all of the legs on the crab remain intact with the body, during steaming. If live crabs are placed directly into the steamer without first being immobilized, they would be unable to be served whole as their legs would fall away from their bodies.

The invention (Shell Shocker) utilizes a unique application of controlled electric current, specific arrangement of electrodes and use of an effective electrolyte solution. The "Shell Shocker" provides a time saving and cost effective method to immobilize live crabs before they are steamed. The "Shell Shocker" enables one bushel of live crabs to be immobilized in 30 seconds. This is a 19 minutes and 30 seconds period of time that is saved per bushel in comparison to the old method of using ice. Accordingly, the "Shell Shocker" eliminates the cost involved with the old method of using ice to immobilize live crabs since no ice is necessary. The "Shell Shocker" has been tested on all sizes of crabs and has proven to be an effective method for processing crabs.

Further objects and advantages of this invention will become more apparent from the following description taken in connection with the accompanying drawings wherein are set forth, by way of illustration and example, certain embodiments of this invention.

BRIEF DESCRIPTION OF THE DRAWINGS

The present invention will be more fully understood by reference to the following detailed description thereof when read in conjunction with the attached drawings, and wherein.

DETAILED DESCRIPTION OF THE DRAWINGS

Figure 1:
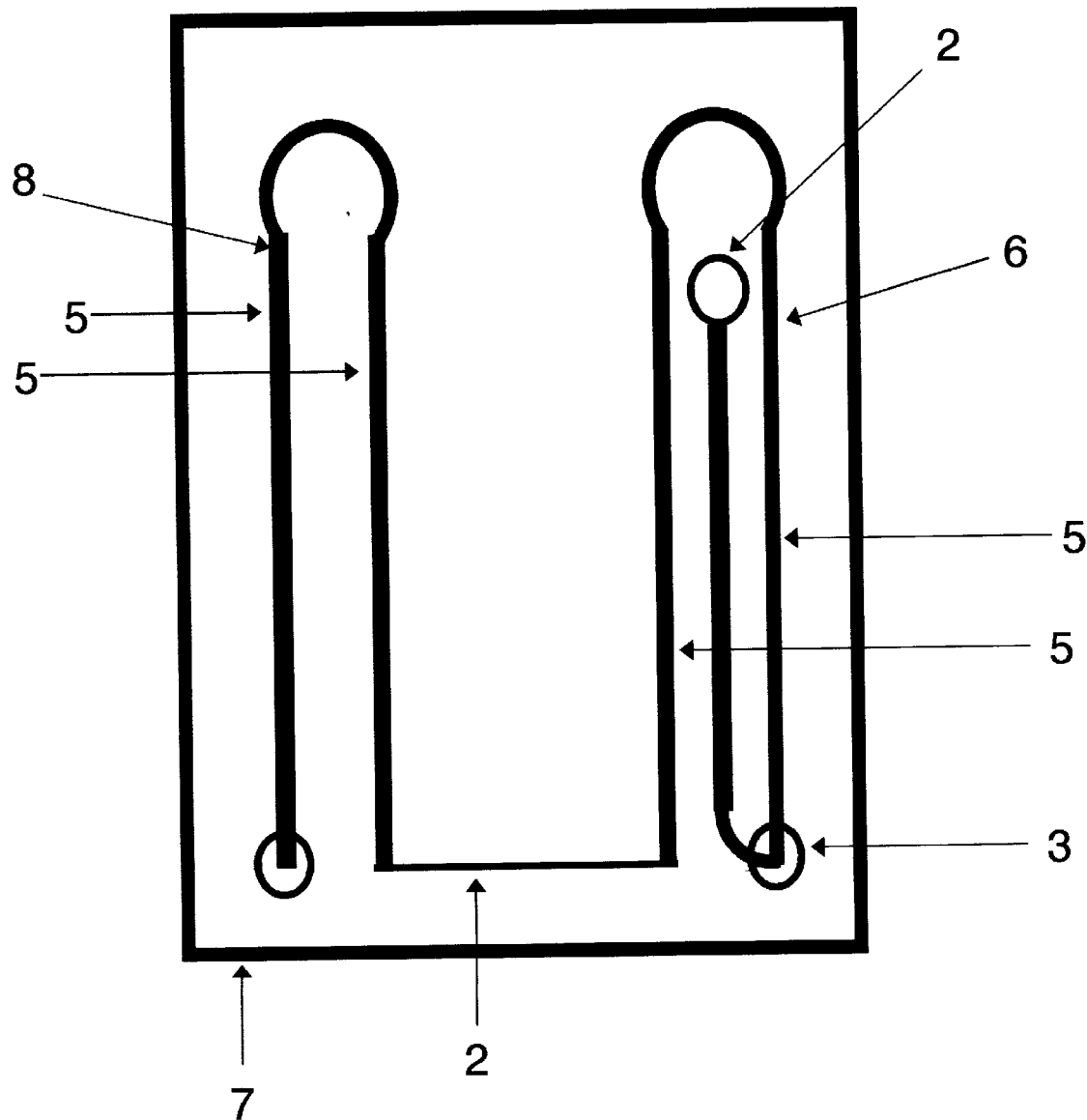
FIG. 1 is a frontal view of the present invention.
Figure 2:
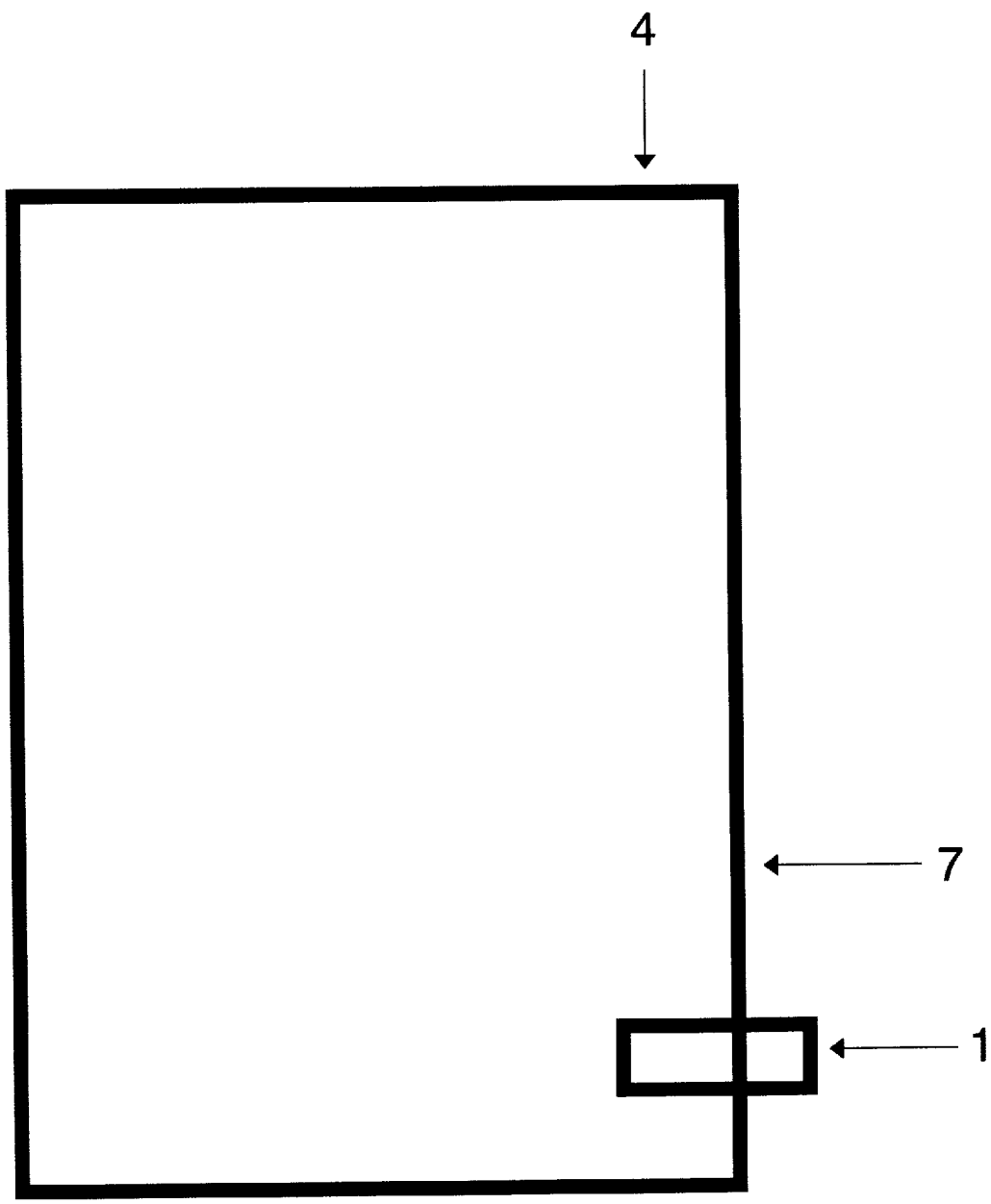
FIG. 2 is a side view of the present invention.

In the disclosed embodiment of the present invention, FIG. 1 shows a frontal view of the "Shell Shocker" which comprises a nonconductive container 7. Preferably, the container 7 is constructed of heavy-duty, commercial standard plastic which insures that the container is durable as well as nonconductive and safe. An electrolyte solution is contained in the container 7 and a drain plug 1, shown in FIG. 2, is located in the bottom of the nonconductive container 7 to provide means for draining the electrolyte solution out of the container. The drain plug 1 is a screw-type plug and is also made of heavy-duty plastic. As also shown in FIG. 2, the container 7 is covered by a lid or top 4 comprised of heavy duty plastic. As a safety precaution, the apparatus is activated for processing hard shell crabs when the top or lid 4 closes the container 7. A safety switch 9, shown in FIG. 3, is positioned in said container 7 and allows for the electricity to be shut off when the lid 4 is ajar.

Located inside the container 7 are positive electrodes 8 and negative electrodes 6 that are each formed by a pair of vertically mounted metal rods 5, as shown in FIG. 1. These metal rods 5 are constructed of stainless steel tubing, thus providing the connection for the positive and negative electrodes 6 and 8, respectively. A standard utility, coated electric wire 2 is inserted through the nonconductive container 7 to provide current to the metal rods 5 via an interconnecting electric wire 3.

Figure 3:
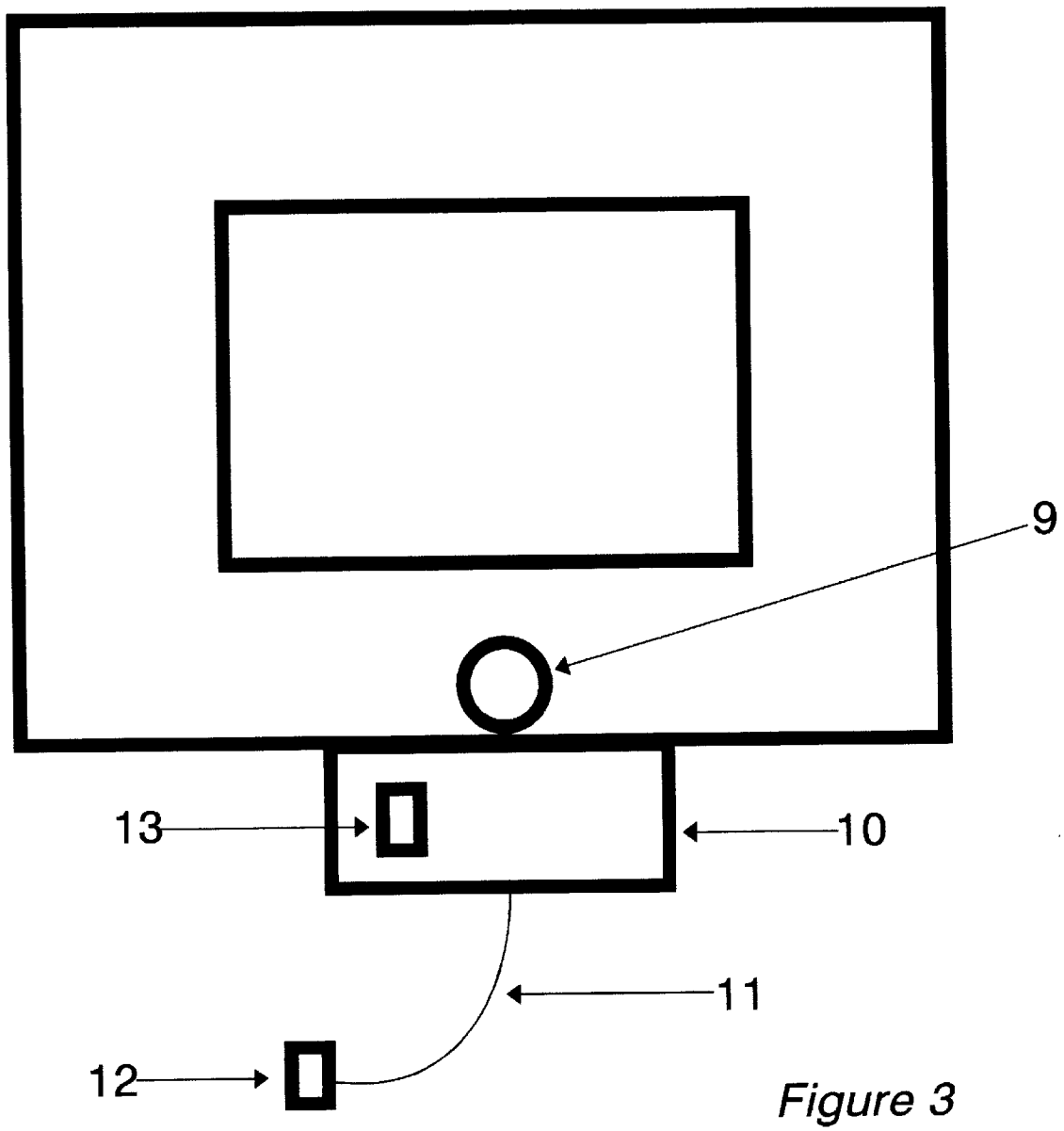
FIG. 3 is an overhead view of the present invention.

Noting FIG. 3, an electric connector box 10 is shown that is constructed of heavy-duty commercial plastic, assuring that the connector box 10 is nonconductive. Contained within the electric connector box 10 is an electric switch and timer 13. An electric cord 11 and plug 12 operate to provide pulsating direct current to the switch and timer 13. The electric cord 11 is a standard electrical cord that connects the apparatus to the electrical plug 12 which is also a standard plug connecting the apparatus with 110 volts of household current. The switch 13, which functions in the standard "On" or "Off" positions, enables the operator of the apparatus to activate the electric power from the source 12 to the positive and negative electrodes 8 and 6. The switch and timer 13 also allows the operator of the apparatus to select the length of time that the standard household current of 110 volts will flow between the positive and negative electrodes 6 and 8.

The above described embodiment of the present invention operates as follows. Initially, the heavy-duty plastic container 7 is partially filled with an electrolyte solution. Live hard shell crabs to be processed are deposited in the container 7 and immersed in the electrolyte solution. Lid or top 4 is positioned to close the container 7 and activate the safety switch 9. The operator then sets the timer 13 for the desired immobilization period and moves the switch 13 to the "On" position to supply an electric power source from the electrical outlet 12 to the positive and negative electrodes 6 and 8. The electrolyte solution transfers this electric energy to the live hard shell crabs causing them to be electrically shocked and consequently immobilized. This arrangement will allow one bushel of live hard shell crabs to be immobilized in approximately 30 seconds while insuring that the legs of the crabs remain intact with their bodies upon steaming after immobilizing. As a result, the "Shell Shocker" provides a safe, cost effective, labor and time saving means to electrically immobilize (stun) crabs.

The embodiments of the present invention recited herein are intended merely to be exemplary and those skilled in the art will be able to make numerous variations and modifications to it without departing from the spirit of the present invention. All such variations and modifications are intended to be within the scope of the present invention as defined by the claims appended hereto.

What is claimed is:

1. An apparatus for the immobilization of live hard shell crabs comprising:

a nonconductive container containing an electrolyte solution, the quantity of said electrolyte solution being sufficient to submerge a number of live hard shell crabs to be processed;

positive and negative electrodes positioned in spaced relationship within the container and being at least substantially covered by the electrolyte solution, each of said electrodes comprising a pair of parallel metal rods projecting vertically from the bottom of the container;

a first electric wire extending inside said container for electrically interconnecting the positive and negative electrodes;

a second electric wire connected to one of the electrodes and extending outside of the container to electrically connect said positive and negative electrodes to a source of electrical power;

an electric connector box attached to an outside wall of the container;

an electric switch means contained in the connector box, said switch means being electrically connected intermediate the second electric wire and an electrical power source for allowing an operator to activate the apparatus, whereby the electrical energy supplied to the electrodes is transferred via the electrolyte solution to the submersed crabs for their immobilization.

2. An apparatus for the immobilization of live hard shell crabs as set forth in claim 1 further comprising:

a nonconductive lid for covering the container;

a safety switch positioned in said container adjacent the opening and in association with the lid for causing the electric power to the electrodes to be shut off when the lid is ajar.

3. An apparatus for the immobilization of live hard shell crabs as set forth in claim 1 further comprising:

a timer incorporated with the electric switch for allowing an operator of the apparatus to select the length of time that the electrical power will flow between the positive and negative electrodes for stunning the submerged crabs.

4. An apparatus for the immobilization of live hard shell crabs as set forth in claim 1 further comprising:

a drain plug located in the bottom of the nonconductive container to provide means for draining the electrolyte solution out of said container.

* * * * *